United States Patent
Brosnan (10) Patent No.: US 8,566,955 B2
(45) Date of Patent: Oct. 22, 2013

(54) USER INDENTIFICATION WITH CAPACITIVE TOUCHSCREEN

(75) Inventor: Michael John Brosnan, Fremont, CA (US)

(73) Assignee: PixArt Imaging Inc., Hsin-Chu (TW)

( * ) Notice: Subject to any disclaimer, the term of this patent is extended or adjusted under 35 U.S.C. 154(b) by 301 days.

(21) Appl. No.: 12/916,553

(22) Filed: Oct. 31, 2010

(65) Prior Publication Data
US 2012/0110662 A1    May 3, 2012

(51) Int. Cl.
G06F 17/30 (2006.01)
G06F 21/00 (2013.01)

(52) U.S. Cl.
USPC .................................. 726/28; 713/186

(58) Field of Classification Search
USPC ......... 713/185, 186, 187, 188; 726/28, 26, 27
See application file for complete search history.

(56) References Cited

U.S. PATENT DOCUMENTS

| | | | |
|---|---|---|---|
| 5,848,176 A * | 12/1998 | Hara et al. | 382/124 |
| 6,292,576 B1 * | 9/2001 | Brownlee | 382/124 |
| 6,950,539 B2 | 9/2005 | Bjorn et al. | |
| 7,673,149 B2 * | 3/2010 | Ritter et al. | 713/186 |
| 2002/0145050 A1 * | 10/2002 | Jayaratne | 235/492 |
| 2002/0145054 A1 * | 10/2002 | Becker et al. | 239/5 |
| 2003/0156744 A1 * | 8/2003 | Hashimoto | 382/124 |
| 2004/0228507 A1 * | 11/2004 | Es | 382/124 |
| 2006/0080525 A1 * | 4/2006 | Ritter et al. | 713/155 |
| 2009/0021487 A1 | 1/2009 | Tien | |
| 2009/0058598 A1 | 3/2009 | Sanchez et al. | |
| 2009/0227295 A1 * | 9/2009 | Kim | 455/566 |
| 2010/0158358 A1 * | 6/2010 | Lienhart et al. | 382/162 |
| 2013/0120278 A1 * | 5/2013 | Cantrell | 345/173 |

FOREIGN PATENT DOCUMENTS

EP    0973123    1/2000

OTHER PUBLICATIONS http://www.eetasia.com/ART 8800424319499495 NT 3378d9fd. HTM, "Touchscreen has Noncontact Sensing, Fingerprint Reading".

* cited by examiner

Primary Examiner — Kambiz Zand
Assistant Examiner — Abu Sholeman
(74) Attorney, Agent, or Firm — Winston Hsu; Scott Margo (57) ABSTRACT

Images are acquired from the touchscreen or touch panel and processed to determine first characteristics corresponding to fingers, hands or hand portions placed thereon. If the first characteristics match stored second characteristics with a sufficient degree of similarity, the user is identified as an authorized or verified user and then permitted to operate or use the electronic device.

25 Claims, 6 Drawing Sheets

USER INDENTIFICATION WITH CAPACITIVE TOUCHSCREEN

FIELD OF THE INVENTION

Various embodiments of the invention described herein relate to the field of capacitive sensing input devices generally, and more specifically to means and methods for identifying verified or authorized users of electronic devices having or operably connected to capacitive and other types of touchscreens.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, the electric fields projecting from the electrodes are altered. As a result, the self-capacitance of the electrode increases. Many touch sensors are configured such that the external object is a finger. The human body is essentially a capacitor to earth where the electric field vanishes, and typically has a capacitance of around 100 pF.

Electrodes in self-capacitance touchpads are typically arranged in rows and columns. By scanning first rows and then columns the locations of individual disturbances induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE.™ In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of m×n intersections with only m+n pins on an IC.

Many electronic devices include devices or systems that provide biometric authentication or verification of an authorized or verified user so that the electronic device remains locked or otherwise unavailable for operation or use by the user until biometric information associated with the user has been verified or authorized by the biometric identification device or system. Once the user has been authorized on the basis of biometric information provided by the user, the electronic device is unlocked or otherwise made available to the user for operation and use. Devices and systems for providing biometric authentication or verification include fingerprint readers, facial imaging and recognition systems, and iris imaging and recognition systems.

Incorporating biometric identification devices and systems into electronic devices typically increases component and manufacturing costs, and also increases design time and complexity. For example, many laptop or portable computers include fingerprint readers that scan a user's fingerprint and determine whether the user is an authorized user. Such fingerprint readers require multiple electronic components and circuitry that are not associated with any functionality in the computer other than fingerprint reading. What is needed are biometric identification means and methods that are less expensive to design and manufacture than existing biometric identification means and methods.

SUMMARY

In one embodiment, there is provided a method of authorizing a user to use an electronic device comprising a capacitive touchscreen system, the method comprising placing at least one of a user's first hand, first hand portion, or plurality of fingers in contact with or in proximity to a capacitive touchscreen forming a portion of the capacitive touchscreen system, generating, with capacitive electrodes in the capacitive touchscreen and a touchscreen controller operably connected to the electrodes, at least one acquired image of the user's first hand, first hand portion, or plurality of fingers, extracting from the acquired image, with the touchscreen controller, a first set of characteristics corresponding to the user's first hand, hand portion, or plurality of fingers, comparing, with the touchscreen controller, the first set of characteristics to a second set of characteristics, the second set of characteristics being stored in a memory, firmware, hardware circuitry, or in a storage device operably connectable to or forming a portion of the touchscreen controller, the second set of characteristics corresponding to at least one authorized user's first hand, first hand portion, or plurality of fingers, determining, with the touchscreen controller, whether the first set of characteristics meets or exceeds a predetermined degree of similarity with respect to the second set of characteristics, and if the first set of characteristics meets or exceeds the predetermined degree of similarity, verifying the user as at least one of the authorized users of the device and permitting the user to use the device.

In another embodiment, there is provided a an electronic device comprising a capacitive touchscreen system, the device comprising a capacitive touchscreen, a touchscreen controller operably connected to the capacitive touchscreen, the touchscreen controller being configured to detect at least one of a user's first hand, first hand portion, or plurality of fingers placed in contact with or in proximity to the capacitive touchscreen, the touchscreen controller further being configured to generate in conjunction with capacitive electrodes in the capacitive touchscreen at least one acquired image of the user's first hand, first hand portion, or plurality of fingers, the touchscreen controller further being configured to extract from the acquired image a first set of characteristics corresponding to the user's first hand, hand portion, or plurality of fingers, compare the first set of characteristics to a second set of characteristics corresponding to at least one authorized user's first hand, first hand portion, or plurality of fingers, determine whether the first set of characteristics meets or exceeds a predetermined degree of similarity with respect to the second set of characteristics, determine whether the first set of characteristics meets or exceeds the predetermined degree of similarity, and verify the user as at least one of the authorized users of the device.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
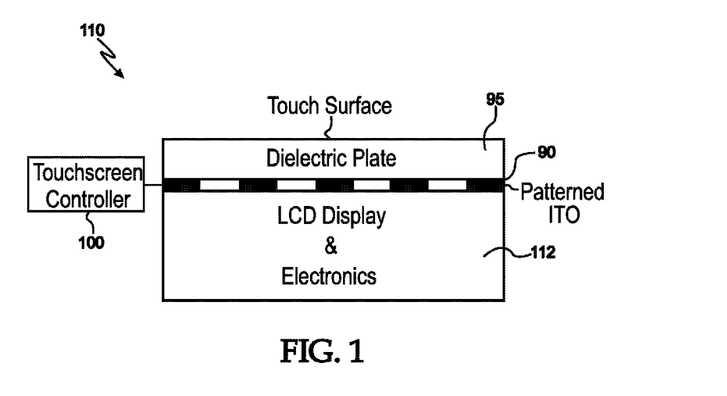
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
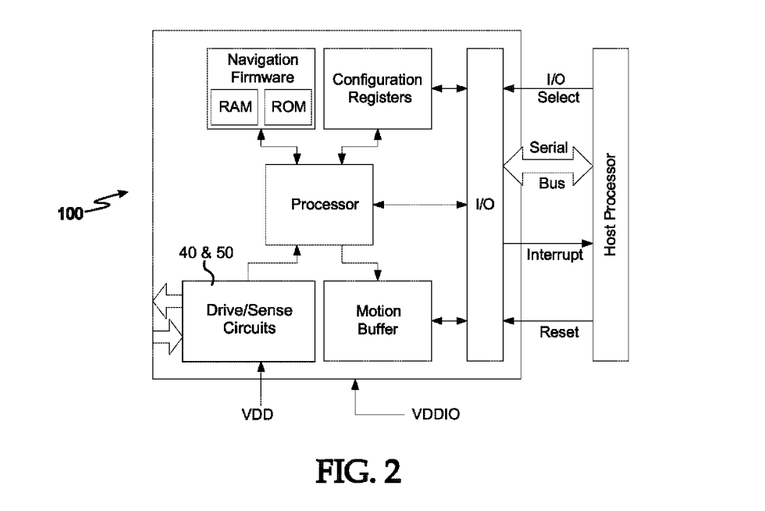
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or similar chip 100 modified in accordance with the teachings presented herein. In one embodiment, touchscreen controller is a low-power capacitive touch-panel controller designed to provide a touchscreen system with high-accuracy, on-screen navigation.

Figure 3:
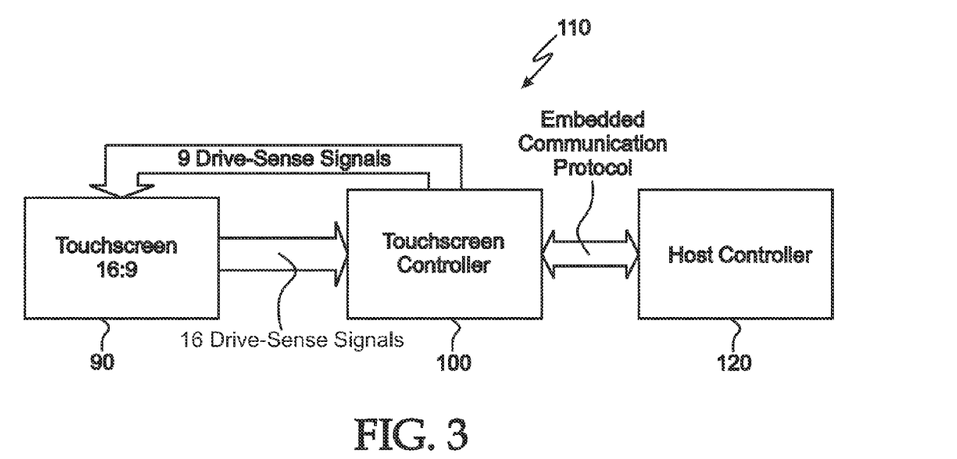
FIG. 3 shows one embodiment of a block diagram of a capacitive touchscreen system and a host controller.
Figure 4:
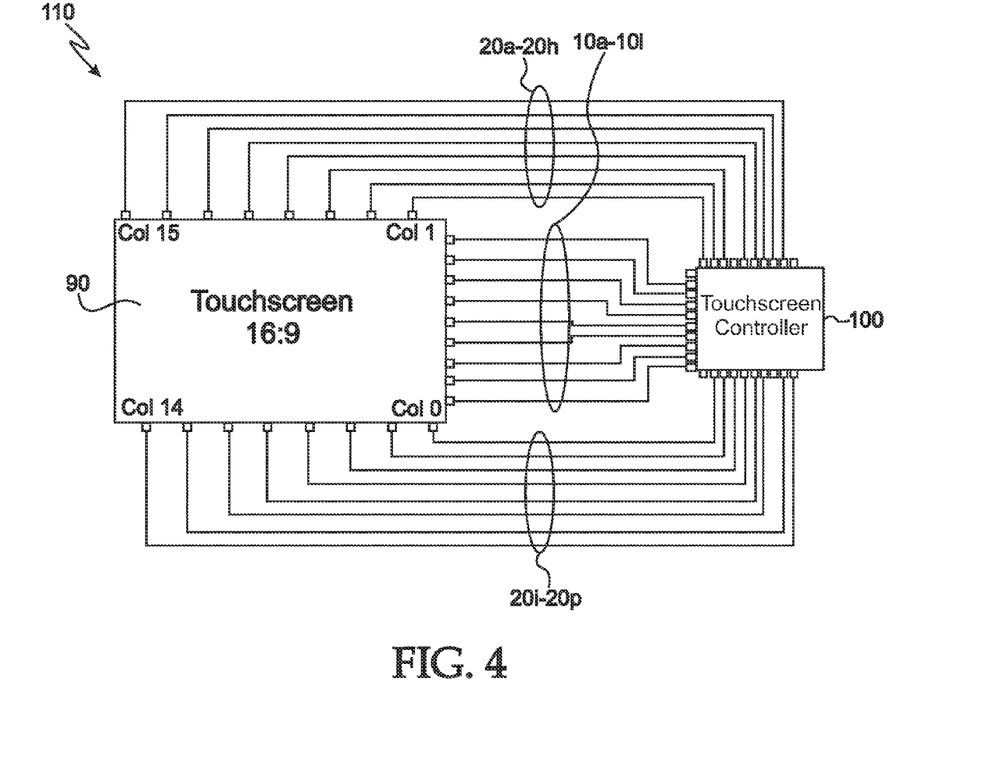
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material; and which is usually configured in the shape of an electrode grid. The capacitance of the grid couples charge from the drive to sense electrodes, and touching the panel with a finger presents a circuit path to the user's body, which causes a change in the capacitance.

Touchscreen controller 100 senses and analyzes the coordinates of these changes in capacitance. When touchscreen 90 is affixed to a device with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, mobile telephones, smart phones, portable media players, mobile internet devices (MIDs), and GPS devices.

Referring now to FIGS. 3 and 4, in one embodiment the touchscreen controller 100 includes an analog front end with 9 sense (or drive) and 16 drive (or sense) signal lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 can feature multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 may automatically shift to the next-lowest power consumption mode. However, as power consumption is reduced the response time to touches typically increases.

According to one embodiment, and as shown in FIG. 4, an ITO grid on the touchscreen 90 comprises rows 20a-20p (or Y lines 1-16) and columns 10a-10i (or X lines 1-9), where rows 20a-20p are operably connected to drive circuits 40 and columns 10a-10i are operably connected to sense circuits 50. One configuration for routing ITO drive and sense lines to touchscreen controller 100 is shown in FIG. 4.

Note that the rows in a touchscreen may be configured to operate as sense lines, and the columns in a touchscreen may be configured to operate as drive lines. Drive lines may also be selectably switched to operate as sense lines, and sense lines may be selectably switched to operate as drive lines under the control of appropriate multiplexing and control circuitry. Moreover, drive and sense lines may be configured in patterns other than rows and columns, or other than orthogonal rows and columns. Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

In one embodiment, the angle between traces 10 and 20 is about 90 degrees (as shown, for example in FIG. 4), but may be any suitable angle such as, by way of example, about 15 degrees, about 30 degrees, about 45 degrees, about 60 degrees, or about 75 degrees. Electrically conductive traces 10 and 20 may be disposed in substantially parallel but vertically-offset first and second planes, respectively, or may be disposed in substantially the same plane. In one embodiment, electrically conductive traces 10 and 20 comprise indium tin oxide ("ITO"), or any other suitable electrically conductive material. A liquid crystal display may be disposed beneath electrically conductive traces 10 and 20, or any other suitable image display. Electrically conductive traces 10 and 20 are preferably disposed on a substrate comprising an electrically insulative material that is substantially optically transparent.

Note that touchscreen system 110 may be incorporated into or form a portion of an LCD, a computer display, a computer, a laptop computer, a notebook computer, an electronic book reader, a personal data assistant (PDA), a mobile telephone, a smart phone, an electronic book reader, a radio, an MP3 player, a portable music player, a stationary device, a television, a stereo, an exercise machine, an industrial control, a control panel, an outdoor control device, a household appliance, or any other suitable electronic device.

In various embodiments disclosed and described herein, internal raw data provided by capacitive touchscreen 90 is employed as image data to identify a user based on biometric identification information, such as patterns associated with the user's hand, hand portion, and/or fingertips being placed in contact with touchscreen 90.

Conventional touchscreen controllers 100 output only x,y coordinates of finger contact or touch locations. Some capacitive touchscreens 90 are capable of acting as low resolution capacitive imaging systems, however. Because each person's hand and fingers have potentially unique dimensions and other characteristics associated with them such as, by way of example, finger size, the contact area associated with one or more fingers, or the distance between fingertips, low resolution capacitive images acquired by touchscreen 90 and touchscreen controller 100 can be used to determine whether the user is an authorized user of the device, or is one from among a relatively small set of authorized users of the device. The images acquired by touchscreen 90 and touchscreen controller 100 can also be used for automatic security customization purposes.

Figure 5:
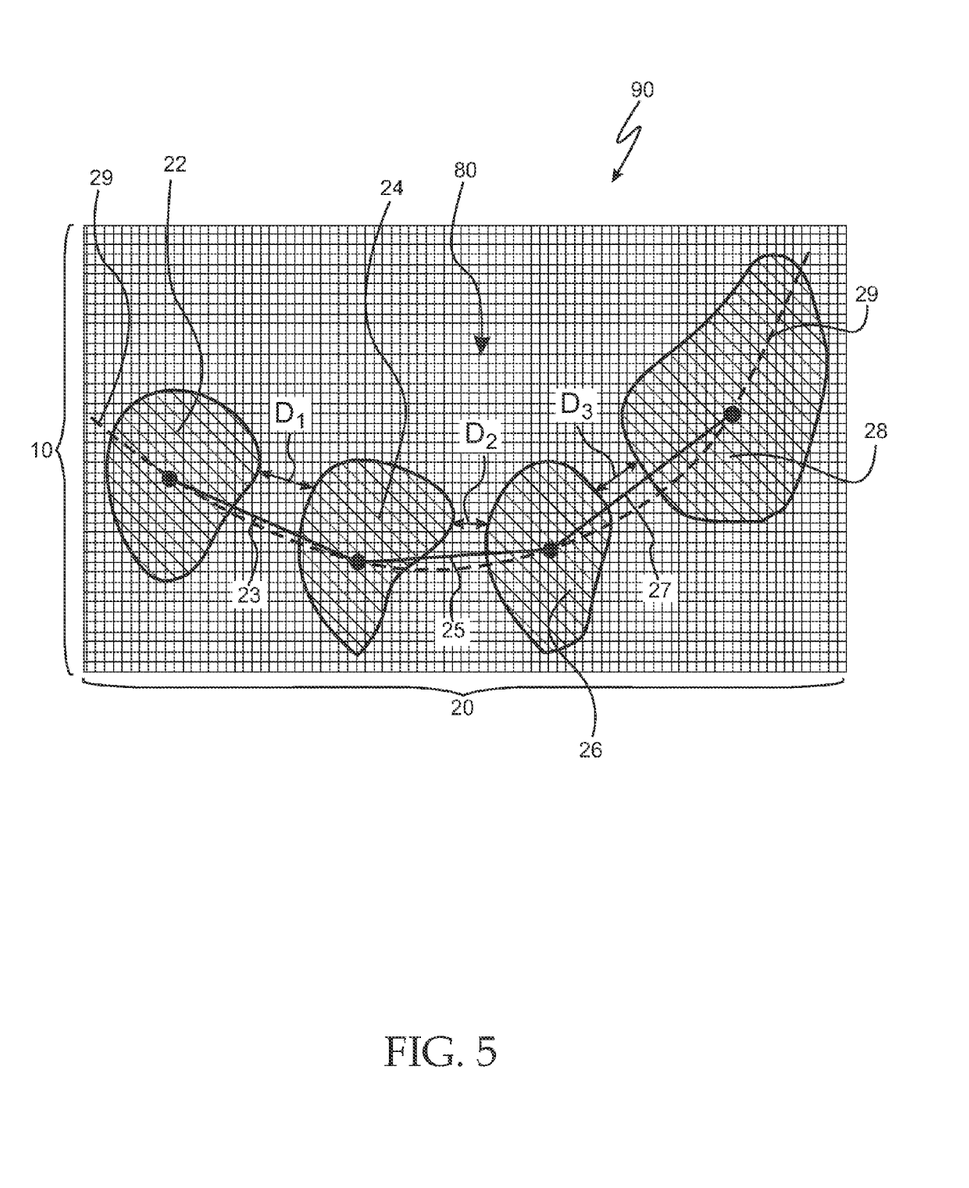
FIG. 5 shows an illustrative image or frame acquired by a capacitive touchscreen system.

In one example of such a capacitive touchscreen system, a 9×16 pixel image 80 acquired by an Avago AMRI-5000 touchscreen controller is shown in FIG. 5, where the resulting user's fingertip pattern is displayed. All fingers were held against one another and touching touchscreen 90. (Note that larger touchscreens 90 may also be employed to acquire images of, for example, a hand or hand portion flattened against touchscreen 90.) As shown in FIG. 5, touches corresponding to fingertip touches or contacts 22, 24, 26 and 28 appear as "hot spots" or areas of high touch signal amplitude in acquired image 80. Contacts 22, 24, 26 and 28 are separated by distances $D_1$, $D_2$ and $D_3$, and are disposed along arc 29, or along line segments 23, 25 and 27 (which in FIG. 5 connect the computed "centers" of contacts 22, 24, 26 and 28, although other embodiments are contemplated). Moreover, and as shown in FIG. 5, each of contacts 22, 24, 26 and 28 is characterized by an area or size associated therewith, and has an outline or shape associated therewith.

As further shown in FIG. 5, acquired image 80 includes contacts corresponding to four finger touches on capacitive touchscreen 90. Other contacts and touches in an acquired image are also contemplated, however, such as one of a user's hands or hand portion, or any number of fingers. Acquired image 80 can include contacts corresponding to one finger, two fingers, three fingers, five fingers, or more than five fingers, from either or both hands. Acquired image 80 can further include all or portions of both of a user's hands, such as the heel of a hand, or the palm of a hand.

Continuing to refer to FIG. 5, touchscreen controller 100 processes acquired to image 80 of FIG. 5, and extracts from acquired image 80 a first set of characteristics corresponding to the user's hand, hand portion, or fingers. Touchscreen controller 100 then compares the first set of characteristics to a second set of characteristics, which are stored in a memory, firmware, hardware circuitry, or in a storage device operably connectable to or forming a portion of touchscreen controller 100, to a second set of characteristics corresponding to at least one authorized user's hand, hand portion, and/or fingers. Touchscreen controller 100 next determines whether the first set of characteristics meets or exceeds a predetermined degree of similarity with respect to the second set of characteristics. If the first set of characteristics meets or exceeds the predetermined degree of similarity, touchscreen controller verifies the user as at least one of the authorized users of the device, and permits the user to operate the device (or at least portions of the device, which may be configured to depend on which the authorized users has been verified).

Note that in one embodiment when the device is initially set up by one or more authorized users, an enrollment process is carried out by touchscreen controller 100, which extracts the second set of characteristics from at least one authorization image corresponding to the one or more authorized users' hands, hand portions, and/or fingers. More about the enrollment process is said below.

In one embodiment, touchscreen controller 100 is programmed and configured to compute or determine the predetermined degree or degrees of similarity using mean square difference computational methods, where the acquired image or data representative thereof are subtracted or otherwise appropriately manipulated with respect to an authorized image or data representative thereof. In another embodiment, touchscreen controller 100 is programmed and configured to compute or determine the predetermined degree or degrees of similarity using cross-correlation computational methods, where the acquired image or data representative thereof are cross-correlated with an authorized image or data representative thereof. Other means and methods for computing or determining the predetermined degree or degrees of similarity may also be employed such as pattern recognition data processing techniques, probability- or statistically-based data processing techniques, or two-dimensional digital filtering techniques.

Touchscreen controller 100 may further be configured to extract at least one of contact areas, centers of contact areas, signal strengths corresponding to contact areas, contact shapes, finger spacing (e.g., $D_1$, $D_2$ and $D_3$ of FIG. 5), and finger curvature (e.g., arc 29 or line segments 23, 25 and 27 of FIG. 5) that correspond to the user's hand, hand portion, and/or fingers. Touchscreen controller 100 may also be configured to generate a first set of data corresponding to the first set of characteristics, and to generate a second set of data corresponding to the second set of characteristics. Touchscreen controller 100 may then be further configured to align the first set of data with respect to the second set of data, and thereby find a match meeting certain predetermined characteristics or thresholds between the first and second data sets. Touchscreen controller 100 may also be further configured to shift the first set of data corresponding to the first set of characteristics with respect to the second set of data corresponding to the second set of characteristics, and thereby find a match meeting certain predetermined characteristics or thresholds between the first and second data sets.

Note that the second set of characteristics may be but one of a plurality of separate sets of characteristics, where each separate set of characteristics corresponds to a unique authorized user.

Figure 6:
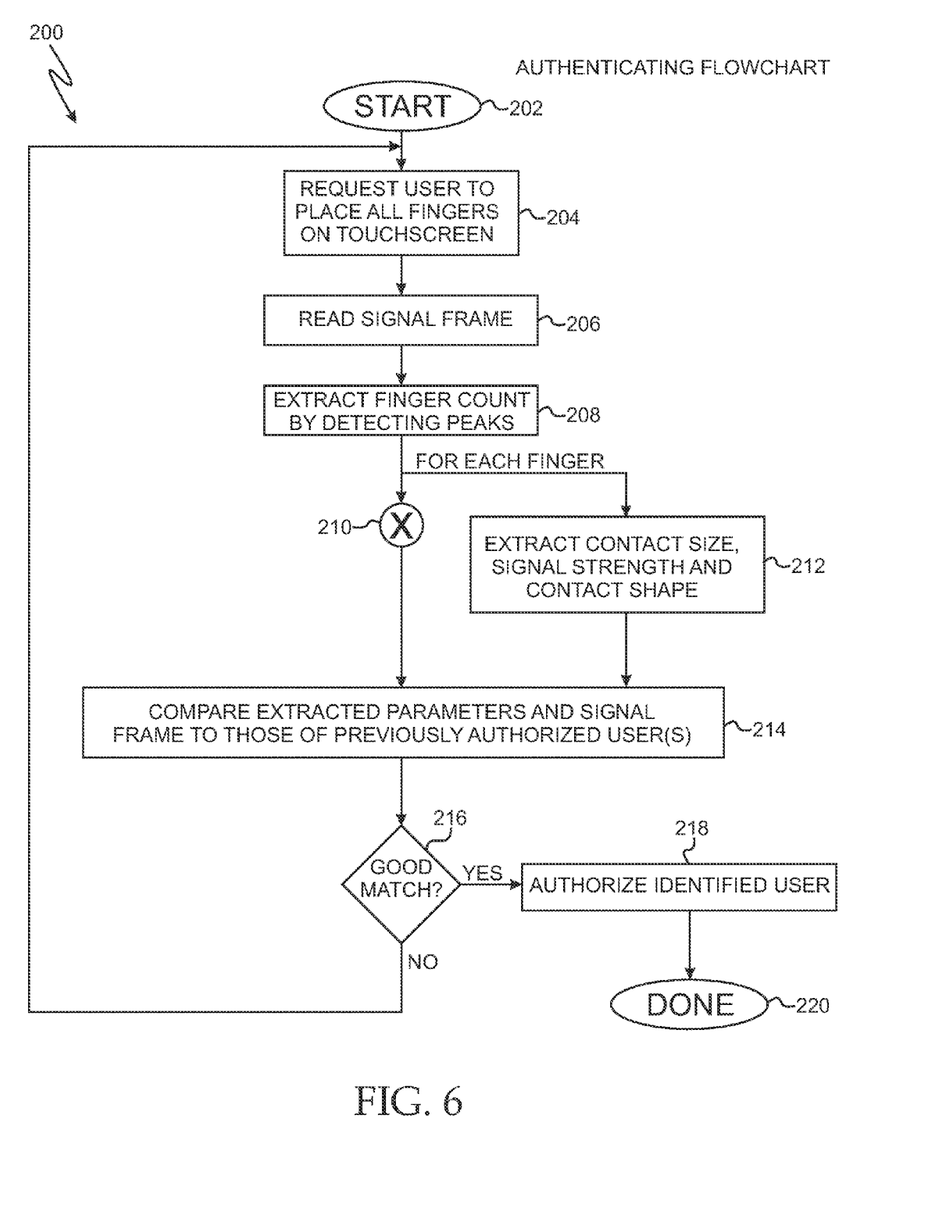
FIG. 6 shows one embodiment of a method of determining whether a user is a verified or authorized user of an electronic device.

Referring now to FIG. 6, there is shown one embodiment of a method corresponding to some of the user authorization or verification techniques and devices disclosed herein. Method 200 begins by requesting at step 204 that a user place all or selected fingers from one or both hands on touchscreen 90. A signal frame or image 80 is acquired by capacitive touchscreen system 110 at step 206. At step 208, a finger count is extracted by touchscreen controller 100 from the acquired image 80 by detecting peaks in the acquired image. For each finger, and as shown at step 212, finger contact size, signal strength, contact shape and/or other parameters are extracted by touchscreen controller 100. The resulting first set of characteristics computed in step 212 is then compared at step 214 to the stored second set of characteristics corresponding to a previously authorized or verified user. If a good match between the first and second sets of characteristics is obtained at step 216, the user is authorized as a verified user.

Figure 7:
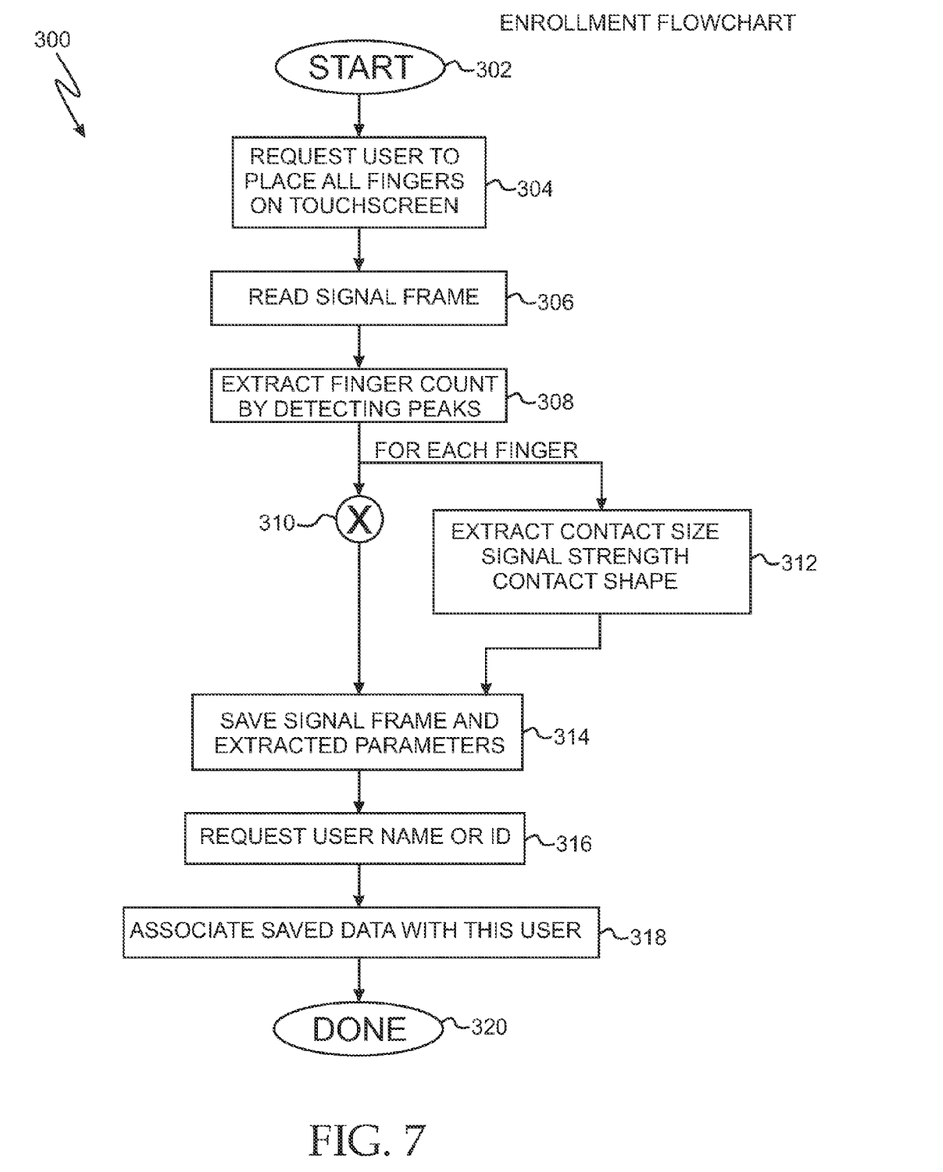
FIG. 7 shows one embodiment of a method of enrolling a verified or authorized user of an electronic device.

As noted above, and in one embodiment, the electronic device is initially set up by an authorized user, touchscreen controller 100 through an enrollment process where touchscreen controller 100 extracts the second set of characteristics from at least one authorization image corresponding to the authorized users' hands, hand portions, and/or fingers. One embodiment of such a method is illustrated in FIG. 7, where method 300 begins by requesting at step 304 that the authorized user place all or selected fingers from one or both hands on touchscreen 90. A signal frame or image 80 is acquired by capacitive touchscreen system 110 at step 306. After image 80 has been acquired, and in one embodiment as shown at step 308, an embedded microcontroller (see FIG. 9) in touchscreen 100 examines acquired image or Signal Frame 80, and extracts a count of finger or hand contact or touch areas by, for example, identifying significant peaks in acquired image or Signal Frame 80. For each finger, and as shown at step 312, relative row and column position of the peak, finger contact size, signal peak strength, contact shape and/or other parameters are extracted by the embedded microcontroller of touchscreen controller 100. The resulting second set of characteristics computed in step 312 is then saved or stored in memory, firmware, hardware circuitry, or in a storage device operably connectable to or forming a portion of touchscreen controller 100. At step 316 the authorized user is requested to provide a name or ID, and at step 318 the stored or save second set of characteristics is associated with the authorized user. Thus, multiple second sets of characteristics can be generated and stored that correspond to different authorized or verified users of the electronic device. Finishing the steps of method 300 shown in FIG. 7 completes a normal enrollment phase. Abnormal enrollment can also be detected at any stage in method 300 by detecting undesired or adverse conditions such as the user not actually placing his or her fingers or hand on the touch panel, or the user placing his or her fingers or hands on touchscreen 90 in manner that is not appropriate for enrollment purposes.

In some embodiments, user identification, verification and/or authorization is performed using the same hardware and signal processing configurations shown in FIG. 9 below, possibly excepting final data interpretation. User identification comprises an initial enrollment phase in which a users' finger, hand or hand portion patterns are associated with the users' names or IDs, and may also include subsequent authentication phases in which a user's finger, hand or hand portion patterns are compared to previously-saved second sets of characteristics to determine which from among a set of verified or authorized users matches best. Matches are generated based not on the prior art concept of fingerprint ridge detail, but on the relative size, positions and/or other characteristics of bulk fingertip or hand contact areas imaged at relatively crude resolutions (for example 9 rows and 16 columns) in acquired capacitive images presented in the Signal Frame.

Figure 8:
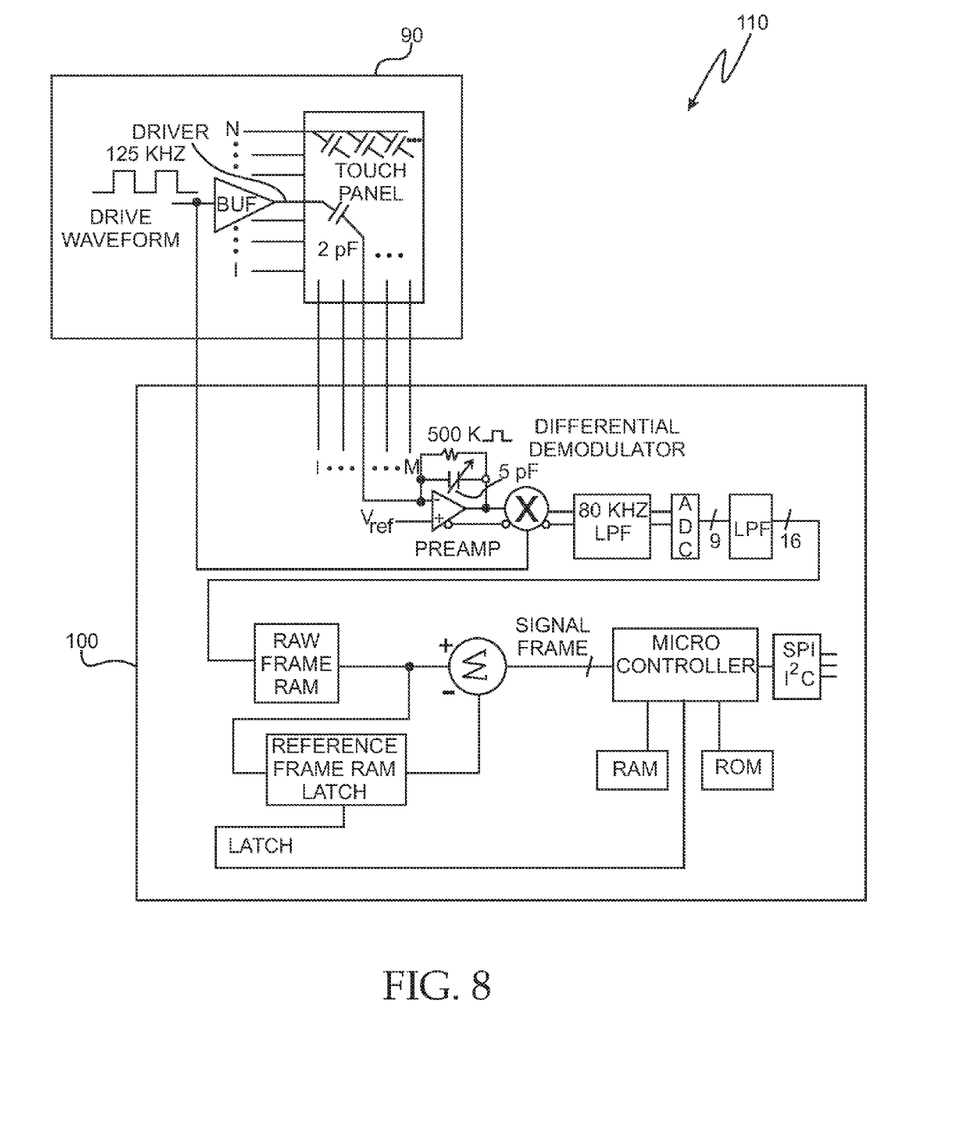
FIG. 8 shows one embodiment of circuitry corresponding to a capacitive touchscreen system configured to acquire capacitive images or frames and determine whether a user is verified or authorized to use an electronic device into which the capacitive touchscreen system is incorporated or operably connected.

Referring now to FIG. 8, there is shown one embodiment of capacitive touchscreen system 110 comprising touchscreen 90 and touchscreen controller 100. A square wave drive waveform of approximately 125 KHz is sequentially applied to each of several rows of the electrodes of capacitive touchscreen 90 through buffers. Touchscreen 90 is characterized by mutual capacitances of approximately 2 pF in magnitude between each row and column. Preamplifiers comprising adjustable capacitances and resistances in feedback loops for each operational amplifier are used on each column to detect signals corresponding to finger, hand or hand portion touches or contacts in each area of touchscreen 90. Contact or touch signals are distinguished from noise by a differential demodulator to extract operational amplifier output components which occur at the same frequency as the drive waveform. A low-pass filter with a cutoff frequency of about 80 KHz is used as an anti-alising filter before the sensed contacts or touches are presented to a 9-bit differential analog-to-digital converter (ADC). Further filtering is performed after the ADC with a digital low-pass filter having a cutoff frequency of approximately 2 KHz. The filter output is then placed in a frame memory (RAM) according to the corresponding location on touchscreen 90 of the active row and column designated in FIG. 8 as the Raw Frame. At times when touchscreen 90 is not being touched by a user, the Raw Frame values are transferred to the Reference Frame RAM. Subsequent contacts or touches of the finger(s), hand(s) or portions of the hand(s) to touchscreen 90 are reflected as changes in the Signal Frame due to reduction in mutual capacitance by the finger(s), hand(s) or portions of the hand (s) due to altering the fringing field patterns between the electrode rows and columns of touchscreen 90, which causes a difference signal to appear at the subtractor output. A microcontroller embedded in touchscreen 90 analyzes values in the Signal Frame, interprets them, and communicates results through a serial data interface such as an SPI or I2C employed in touchscreen system 100 and the electronic device.

Data interpretation by a microcontroller in touchscreen 100 can include, but is not limited to, reporting the row and column positions of finger, hand or hand portion contacts or touches, as well as the number of fingers, hands or hand portions detected The capacitive touchscreen systems described above may be employed in electronic devices, and in mobile electronic devices such as computers, notebook computers, laptop computers, personal data assistants (PDAs), mobile telephones, smart phones, electronic book readers, a adios, MP3 players, and portable music players.

The systems, devices and methods described above are not limited to those employing capacitive touchscreens, and include within their scope systems, devices and methods that employ resistive touch panels or touchscreens.

Note that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

I claim:

1. A method of authorizing a user to use an electronic device comprising a capacitive touchscreen system, the method comprising:
    placing at least one of a user's first hand, first hand portion, or plurality of fingers in contact with or in proximity to a capacitive touchscreen forming a portion of the capacitive touchscreen system;
    generating, with capacitive electrodes in the capacitive touchscreen and a touchscreen controller operably connected to the electrodes, at least one acquired image of the user's first hand, first hand portion, or plurality of fingers;
    extracting from the one acquired image, with the touchscreen controller, a first set of characteristics corresponding to at least one of contact areas, centers of contact areas, signal strengths corresponding to contact areas, contact shapes, finger spacing, and finger orientations of the user's first hand, hand portion, or plurality of fingers;
    comparing, with the touchscreen controller, the first set of characteristics to a second set of characteristics, the second set of characteristics being stored in a memory, firmware, hardware circuitry, or in a storage device operably connectable to or forming a portion of the touchscreen controller, the second set of characteristics corresponding to at least one of contact areas, centers of contact areas, signal strengths corresponding to contact areas, contact shapes, finger spacing, and finger orientations of at least one authorized user's first hand, first hand portion, or plurality of fingers;
    determining, with the touchscreen controller, whether the first set of characteristics meets or exceeds a predetermined degree of similarity with respect to the second set of characteristics, and
    if the first set of characteristics meets or exceeds the predetermined degree of similarity, verifying the user as at least one of the authorized users of the device and permitting the user to use the device.

2. The method of claim 1, further comprising determining, in the touchscreen controller, the predetermined degree of similarity using mean square difference computational methods.

3. The method of claim 1, further comprising determining, in the touchscreen controller, the predetermined degree of similarity using cross-correlation computational methods.

4. The method of claim 1, wherein the second set of characteristics is extracted from at least one authorization image corresponding to the authorized user's first hand, first hand portion, or plurality of fingers.

5. The method of claim 1, further comprising rotating, in the touchscreen controller, a first set of data corresponding to the first set of characteristics with respect to a second set of data corresponding to the second set of characteristics.

6. The method of claim 5, further comprising aligning, in the touchscreen controller, the first set of data with respect to the second set of data to find a match having predetermined characteristics therebetween.

7. The method of claim 1, further comprising shifting, in the touchscreen controller, a first set of data corresponding to the first set of characteristics with respect to a second set of data corresponding to the second set of characteristics.

8. The method of claim 7, further comprising aligning, in the touchscreen controller, the first set of data with respect to the second set of data to find a match having predetermined characteristics therebetween.

9. The method of claim 1, wherein the first set of characteristics are further determined on the basis of the user's second hand, second hand portion, or plurality of fingers from the second hand.

10. The method of claim 1, wherein second set of characteristics is one of a plurality of separate sets of characteristics, each separate set of characteristics corresponding to a unique authorized user.

11. The method of claim 1, wherein the electronic device is a mobile electronic device.

12. The method of claim 11, wherein the mobile device is one of a computer, a notebook computer, a laptop computer, a personal data assistant (PDA), a mobile telephone, a smart phone, an electronic book reader, a radio, an MP3 player, and a portable music player.

13. An electronic device comprising a capacitive touchscreen system, comprising:
    a capacitive touchscreen; and
    a touchscreen controller operably connected to the capacitive touchscreen, the touchscreen controller being configured to detect at least one of a user's first hand, first hand portion, or plurality of fingers placed in contact with or in proximity to the capacitive touchscreen, the touchscreen controller further being configured to generate in conjunction with capacitive electrodes in the capacitive touchscreen one acquired image of the user's first hand, first hand portion, or plurality of fingers, the touchscreen controller further being configured to extract from the one acquired image a first set of characteristics corresponding to at least one of contact areas, centers of contact areas, signal strengths corresponding to contact areas, contact shapes, finger spacing, and finger orientations of the user's first hand, hand portion, or plurality of fingers, compare the first set of characteristics to a second set of characteristics corresponding to at least one of contact areas, centers of contact areas, signal strengths corresponding to contact areas, contact shapes, finger spacing, and finger orientations of at least one authorized user's first hand, first hand portion, or plurality of fingers, determine whether the first set of characteristics meets or exceeds a predetermined degree of similarity with respect to the second set of characteristics, determine whether the first set of characteristics meets or exceeds the predetermined degree of similarity, and verify the user as at least one of the authorized users of the device.

14. The capacitive touchscreen system of claim 13, wherein the touchscreen controller further comprises memory, firmware, hardware circuitry, or a storage device operably connectable to or forming a portion thereof for storing the second set of characteristics.

15. The capacitive touchscreen system of claim 13, wherein the touchscreen controller is further configured to determine the predetermined degree of similarity using mean square difference computational methods.

16. The capacitive touchscreen system of claim 13, wherein the touchscreen controller is further configured to determine the predetermined degree of similarity using cross-correlation computational methods.

17. The capacitive touchscreen system of claim 13, wherein the touchscreen controller is further configured to extract the second set of characteristics from at least one authorization image corresponding to the authorized user's first hand, first hand portion, or plurality of fingers.

18. The capacitive touchscreen system of claim 13, wherein the touchscreen controller is further configured to rotate a first set of data corresponding to the first set of characteristics with respect to a second set of data corresponding to the second set of characteristics.

19. The capacitive touchscreen system of claim 18, wherein the touchscreen controller is further configured to align the first set of data with respect to the second set of data to find a match having predetermined characteristics therebetween.

20. The capacitive touchscreen system of claim 13, wherein the touchscreen controller is further configured to shift a first set of data corresponding to the first set of characteristics with respect to a second set of data corresponding to the second set of characteristics.

21. The capacitive touchscreen system of claim 20, wherein the touchscreen controller is further configured to align the first set of data with respect to the second set of data to find a match having predetermined characteristics therebetween.

22. The capacitive touchscreen system of claim 13, wherein the touchscreen controller is further configured to determine the first set of characteristics on the basis of the user's second hand, second hand portion, or plurality of fingers from the second hand.

23. The capacitive touchscreen system of claim 13, wherein the second set of characteristics is one of a plurality of separate sets of characteristics, each separate set of characteristics corresponding to a unique authorized user.

24. The capacitive touchscreen system of claim 13, wherein the electronic device is a mobile electronic device.

25. The capacitive touchscreen system of claim 24, wherein the mobile device is one of a computer, a notebook computer, a laptop computer, a personal data assistant (PDA), a mobile telephone, a smart phone, an electronic book reader, a radio, an MP3 player, and a portable music player.

* * * * *